(12) United States Patent
Aoki

(10) Patent No.: US 10,350,721 B2
(45) Date of Patent: Jul. 16, 2019

(54) WORK TOOL

(71) Applicant: MAKITA CORPORATION, Anjo-shi, Aichi (JP)

(72) Inventor: Yonosuke Aoki, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 314 days.

(21) Appl. No.: 15/316,314

(22) PCT Filed: Jun. 2, 2015

(86) PCT No.: PCT/JP2015/065949
§ 371 (c)(1),
(2) Date: Dec. 5, 2016

(87) PCT Pub. No.: WO2015/186715
PCT Pub. Date: Dec. 10, 2015

(65) Prior Publication Data
US 2017/0136599 A1    May 18, 2017

(30) Foreign Application Priority Data

Jun. 5, 2014  (JP) .................................. 2014-117126

(51) Int. Cl.
*B24B 23/04* (2006.01)
*B25F 5/00* (2006.01)
*B23D 57/00* (2006.01)

(52) U.S. Cl.
CPC .............. *B24B 23/04* (2013.01); *B23D 57/00* (2013.01); *B25F 5/00* (2013.01); *B25F 5/006* (2013.01)

(58) Field of Classification Search
CPC .................................. B23D 57/00; B24B 23/04
USPC ............ 279/141, 144; 30/276; 173/213, 217
See application file for complete search history.

(56) References Cited

U.S. PATENT DOCUMENTS

| 4,322,921 A | 4/1982 | Maier | |
| 7,104,873 B1 * | 9/2006 | Borinato | B24B 23/03 451/121 |
| 8,381,833 B2 * | 2/2013 | Bernardi | B25B 28/00 173/162.1 |

(Continued)

FOREIGN PATENT DOCUMENTS

| AU | 2014100021 A4 | 1/2014 |
| EP | 2596908 A1 | 5/2013 |

(Continued)

OTHER PUBLICATIONS

Sep. 25, 2017 Office Action issued in Japanese Patent Application No. 2014-117126.

(Continued)

*Primary Examiner* — Nathaniel C Chukwurah
(74) *Attorney, Agent, or Firm* — Oliff PLC

(57) ABSTRACT

An electric oscillating tool has an electric motor having an output shaft, an eccentric shaft that is connected to one end region of the output shaft, and a weight that is connected to the other end region of the output shaft. A blade as a tool accessory is driven to reciprocally rotate around a spindle by reciprocating motion of the eccentric shaft in a transverse direction of the electric oscillating tool. The weight is driven to cancel out the inertial force of the eccentric shaft, so that the output shaft is stably rotated.

13 Claims, 5 Drawing Sheets

(56) References Cited

U.S. PATENT DOCUMENTS

| | | | |
|---|---|---|---|
| 2009/0311952 A1* | 12/2009 | Zaiser | B24B 23/04 |
| | | | 451/357 |
| 2012/0192438 A1 | 8/2012 | Aoki et al. | |
| 2012/0227520 A1 | 9/2012 | Keith | |
| 2013/0181414 A1* | 7/2013 | Haman | B27B 19/006 |
| | | | 279/144 |
| 2013/0220659 A1 | 8/2013 | Itakura et al. | |
| 2015/0042052 A1 | 2/2015 | Furusawa et al. | |

FOREIGN PATENT DOCUMENTS

| | | |
|---|---|---|
| JP | S56-52171 A | 5/1981 |
| JP | S56-104854 U | 8/1981 |
| JP | 2013-158879 A | 8/2013 |
| JP | 2013-173202 A | 9/2013 |

OTHER PUBLICATIONS

Feb. 12, 2018 Search Report issued in European Patent Application No. 15803818.2.
Aug. 25, 2016 International Search Report issued in International Patent Application No. PCT/JP2015/065949.
Dec. 6, 2016 Internation Preliminary Report on Patentability issued in International Patent Application No. PCT/JP2015/065949.

* cited by examiner

WORK TOOL

TECHNICAL FIELD

The present invention relates to a work tool which performs a prescribed operation.

BACKGROUND ART

Japanese laid-open patent publication No. 2013-173202 discloses a reciprocally rotating power tool which causes a cutting tool to reciprocally rotate in a transverse direction around an axis of a spindle by a motor. In this power tool, a crank shaft which is driven by the motor is provided. An eccentric shaft is provided on the crank shaft. The eccentric shaft is provided at a position displaced from an axial center of an output shaft of the motor which is a center of a rotation axis of the crank shaft.

SUMMARY OF THE INVENTION

Problem to be Solved by the Invention

In the above-described power tool, when the eccentric shaft is driven around the axial center of the output shaft of the motor, centrifugal force acts on the eccentric shaft. By this centrifugal force, radial force acts on the front end of the output shaft of the motor. As a result, the output shaft which is supported in a cantilever form by a bearing precesses around the bearing. Therefore, during rotation of the output shaft, uneven force acts on the bearing. Thus, vibration may be caused in the power tool body via the bearing.

Accordingly, it is an object of the present invention to provide an improved technique for suppressing vibration caused by rotation of an output shaft of a motor to which an eccentric shaft is connected, in a work tool.

Embodiment to Solve the Problem

The above-described problem is solved by the present invention. According to a preferred aspect of the present invention, a work tool is provided which performs an operation on a workpiece by driving a tool accessory. The work tool has a motor having an output shaft, a bearing member that rotatably supports the output shaft, an eccentric shaft that is connected to the output shaft at a position located closer to one end of the output shaft than the bearing member in an output shaft extending direction in which the output shaft extends and displaced from a center of a rotation axis of the output shaft, and is rotationally driven together with the output shaft by rotation of the output shaft to thereby drive the tool accessory, and a balancer that is connected to the output shaft at a position located closer to the other end of the output shaft than the bearing member in the output shaft extending direction and is driven by rotation of the output shaft to thereby suppress vibration caused in the work tool.

Typically, the eccentric shaft which is driven by the output shaft forms a crank mechanism. The eccentric shaft may be connected to the output shaft by directly mounting to the output shaft, or by mounting a crank shaft having the eccentric shaft onto the output shaft.

The balancer typically has a weight having a prescribed weight, and when the balancer is rotationally driven by the output shaft, the center of gravity of the weight moves around the rotation axis of the output shaft. Specifically, the center of gravity of the weight is arranged at a position displaced from the center of the rotation axis of the output shaft. This balancer forms a vibration suppressing mechanism for suppressing vibration caused by driving of the eccentric shaft around the rotation axis. The weight may be formed by a single weight or by a plurality of weight elements. Further, the tool accessory typically rotates reciprocally by a prescribed angle around the axis by swinging of a driven arm (also referred to as a swinging arm) provided as a tool accessory drive member connected to the eccentric shaft. Thus, the work tool is preferably configured as an oscillating tool.

According to the present invention, when the eccentric shaft is rotationally driven around the rotation axis, centrifugal force acts on the eccentric shaft, but the balancer reduces the influence of the centrifugal force of the eccentric shaft and thereby suppresses precession of the output shaft around the bearing member. Therefore, the bearing member is prevented from being acted upon by uneven force during rotation of the output shaft, so that vibration caused in the work tool is suppressed. As a result, operability or usability of the work tool for a user can be improved. Further, since the bearing member is prevented from being acted upon by uneven force, durability of the bearing member is enhanced.

According to a further aspect of the work tool of the present invention, the work tool further has a tool accessory drive shaft to which the tool accessory is attached, and a connecting arm (also referred to as a swinging aim) connected to the tool accessory drive shaft. The connecting arm is caused to swing around the tool accessory drive shaft in a crossing direction crossing the output shaft extending direction, by reciprocating movement of the eccentric shaft in the crossing direction which is caused by rotation of the output shaft. Thus, the tool accessory is caused to swing around the tool accessory drive shaft by swinging of the connecting aim and thereby performs an operation on a workpiece. Specifically, an oscillating tool is provided in which the tool accessory oscillates around the tool accessory drive shaft. The balancer is driven with the center of gravity of the balancer in the same phase as the eccentric shaft in the crossing direction. Specifically, when the eccentric shaft is located on one side with respect to the rotation axis center of the output shaft in the crossing direction, the center of gravity of the balancer is also located on the one side with respect to the rotation axis center of the output shaft. When the eccentric shaft is located on the other side with respect to the rotation axis center of the output shaft in the crossing direction, the center of gravity of the balancer is also located on the other side with respect to the rotation axis center of the output shaft. With this structure in which the balancer is driven in the same phase as the eccentric shaft in the crossing direction, moment around the axis in the radial direction of the output shaft is effectively reduced.

According to a further aspect of the work tool of the present invention, the work tool further has a second balancer that is arranged closer to the one end of the output shaft than the bearing member in the output shaft extending direction. The second balancer is driven with a center of gravity of the second balancer in opposite phase to the eccentric shaft in the crossing direction. Therefore, the second balancer is driven in opposite phase to the balancer disposed on the other end region of the output shaft. The second balancer typically has a second weight having a prescribed weight, and when the second balancer is rotationally driven by the output shaft, the center of gravity of the second weight moves around the rotation axis of the output shaft. Specifically, the center of gravity of the second balancer is arranged at a position displaced from the center of the rotation axis of the output shaft. With this structure in which the second balancer is arranged closer to the one end of the output shaft together with the eccentric shaft than the bearing member and is driven in opposite phase to the eccentric shaft, the centrifugal force of the eccentric shaft is cancelled by the second balancer. Thus, the influence of the centrifugal force of the eccentric shaft on the output shaft is reduced.

According to a further aspect of the work tool of the present invention, the bearing member includes a first bearing part for supporting one end region of the output shaft and a second bearing part for supporting the other end region of the output shaft in the output shaft extending direction. The balancer is disposed on a side of the second bearing part opposite to the eccentric shaft in the output shaft extending direction. Thus, the balancer and the eccentric shaft are disposed on opposite sides of the bearing member which supports the output shaft, to each other.

Further, the motor has a motor body having a rotor and a stator. The first bearing part is arranged closer to the one end of the output shaft than the motor body in the output shaft extending direction, and the second bearing part is arranged closer to the other end of the output shaft than the motor body in the output shaft extending direction. Thus, the balancer and the eccentric shaft are disposed on opposite sides of the motor body to each other.

According to a further aspect of the work tool of the present invention, the balancer is mounted onto the output shaft. Therefore, the balancer rotates together with the output shaft. Thus, it is not necessary to provide a member for driving the balancer, so that the part count of the work tool is reduced.

According to a further aspect of the work tool of the present invention, the balancer has a fan-shaped part having a circular arc part with its center on the center of the rotation axis of the output shaft in a section perpendicular to the output shaft extending direction. With this structure, the center of gravity of the balancer is arranged at a position displaced from the center of the rotation axis of the output shaft, and the balancer is efficiently rotationally driven by rotation of the output shaft.

Effect of the Invention

According to the present invention, an improved technique for suppressing vibration caused by rotation of an output shaft of a motor to which an eccentric shaft is connected is provided in a work tool.

Other objects, features and advantages of the present invention will be readily understood after reading the following detailed description together with the accompanying drawings and the claims.

REPRESENTATIVE EMBODIMENT FOR EXPLOITING THE INVENTION

Each of the additional features and method steps disclosed above and below may be utilized separately or in conjunction with other features and method steps to provide improved work tools and devices utilized therein. Representative examples of this invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Embodiment)

Figure 1:
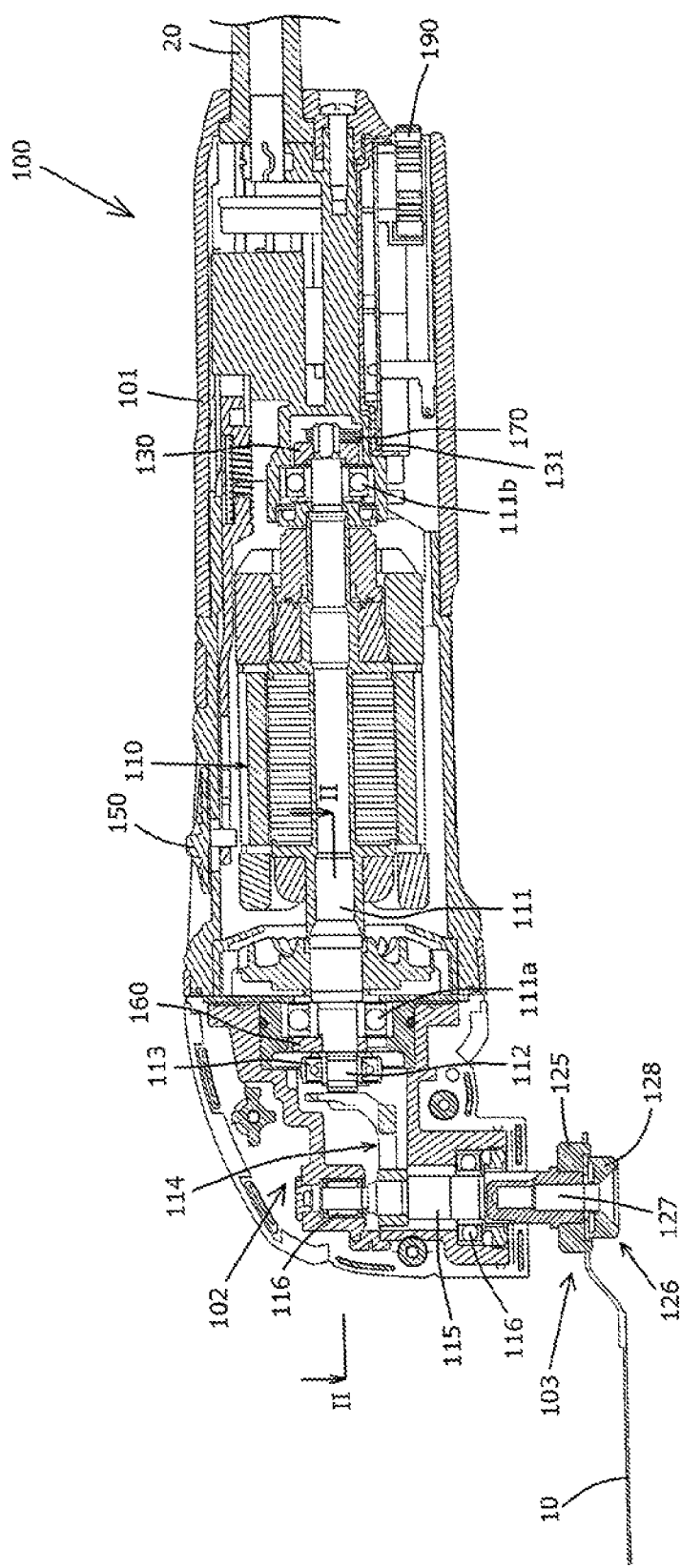
FIG. 1 is a sectional view showing the overall structure of a work tool according to a first embodiment of the present invention.

A first embodiment of the present invention is now described with reference to FIGS. 1 to 4. In this embodiment, an electric oscillating tool is described as a representative example of a work tool according to the present invention. As shown in FIG. 1, the electric oscillating tool 100 is a work tool to which a tool selected from various kinds of tools such as a blade and a polishing pad is attached and which performs an operation, such as a cutting operation and a polishing operation, appropriate for the selected tool on a workpiece by oscillating the tool attached thereto. The electric oscillating tool 100 is also referred to as a multi-tool. In this embodiment, a blade 10 is described as a representative example of the tool. A tool such as the blade 10 is an example embodiment that corresponds to the "tool accessory" according to the present invention.

Figure 2:
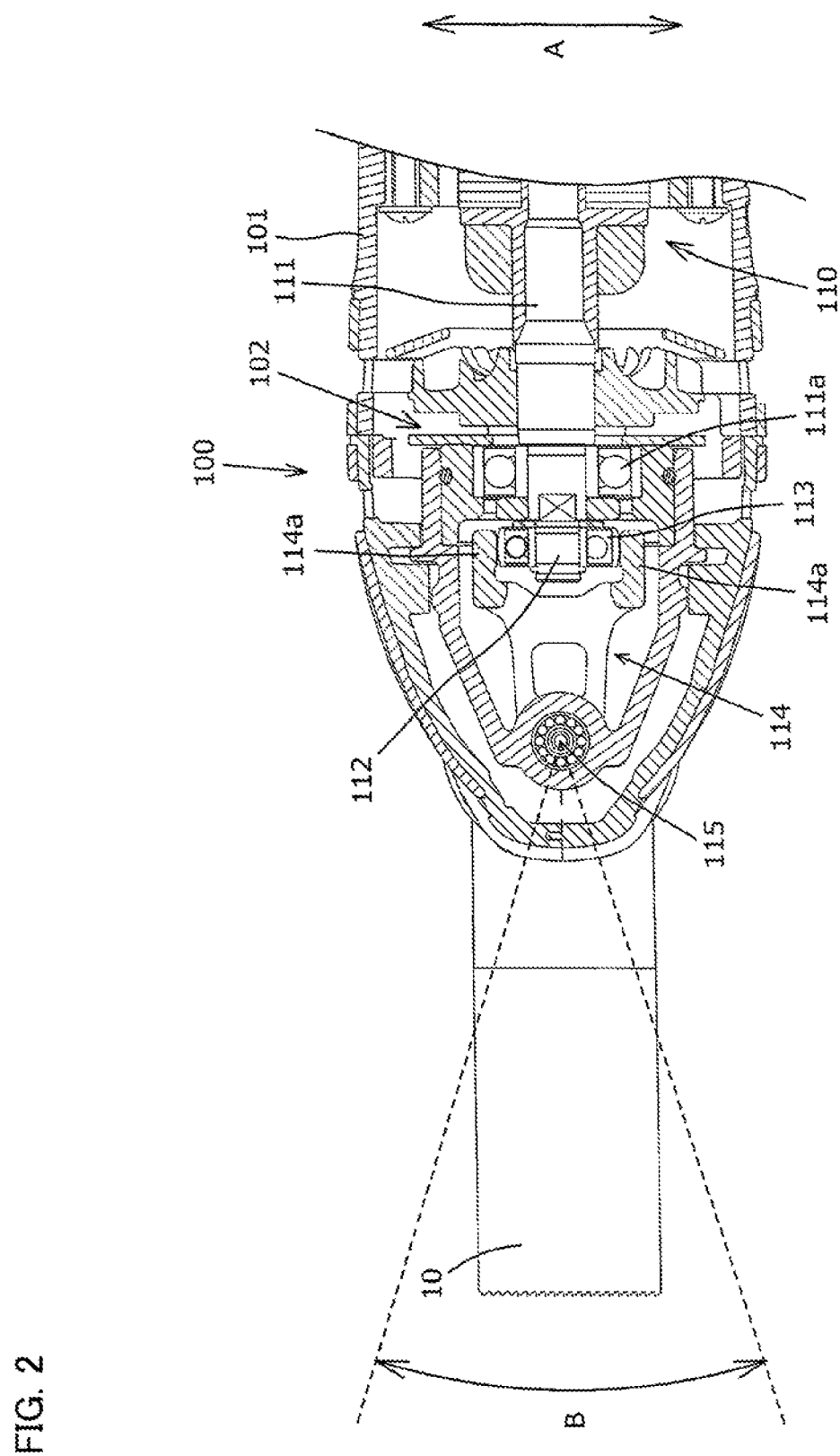
FIG. 2 is sectional view taken along line II-II in FIG. 1.

The electric oscillating tool 100 has an outer shell formed by a generally cylindrical body housing 101 as shown in FIGS. 1 and 2. A switch 150 for switching on and off the electric oscillating tool 100 is provided on an upper surface of the body housing 101 as shown in FIG. 1. The switch 150 can be manually operated by a user. The body housing 100 houses a driving mechanism 102. In a longitudinal direction of the body housing 101 (horizontal direction as viewed in FIG. 1), the blade 10 is attached to one end region, and a power cable 20 for supplying current to the electric oscillating tool 100 is attached to the other end region. For the sake of explanation, in the longitudinal direction of the electric oscillating tool 100, the blade 10 side (left side as viewed in FIG. 1) and the power cable 20 side (right side as viewed in FIG. 1) are referred to as a front side and a rear side of the electric oscillating tool 100, respectively.

As shown in FIGS. 1 and 2, the driving mechanism 102 mainly includes an electric motor 110, an eccentric shaft 112, a bearing 113, a driven arm 114 and a spindle 115. The electric motor 110 has a motor body having a rotor and a stator, and an output shaft 111 which is rotated together with the rotor. The electric motor 110 is arranged such that the output shaft 111 extends substantially in parallel to the longitudinal direction of the body housing 101. A front end of the output shaft 111 is rotatably supported by a front bearing 111a which is fixed to the body housing 101, and a rear end of the output shaft 111 is rotatably supported by a rear bearing 111b which is fixed to the body housing 101.

Specifically, the front bearing 111a is provided in front of the motor body, and the rear bearing 111b is provided behind the motor body. The electric motor 110 and the output shaft 111 are example embodiments that correspond to the "motor" and the "output shaft", respectively, according to the present invention. The front bearing 111a and the rear bearing 111b are an example embodiment that correspond to the "bearing member" according to the present invention.

The eccentric shaft 112 is disposed on a front end of the output shaft 111 of the electric motor 110 and arranged to extend in parallel to a rotation axis of the output shaft 111. The eccentric shaft 112 is arranged at a position displaced from an axial center (center of rotation) of the output shaft 111. The eccentric shaft 112 is an example embodiment that correspond to the "eccentric shaft" according to the present invention. The bearing 113 is fitted on the eccentric shaft 112. An outer circumferential surface of the bearing 113 has a spherical shape curved outward in a radial direction of the bearing 113. The bearing 113 is also referred to as a sphere bearing. The driven arm 114 is connected to one end region of the spindle 115 in an extending direction of the spindle 115. Further, as shown in FIG. 2, the driven arm 114 has two arm parts 114a extending from the spindle 115 toward the electric motor 110. The driven arm 114 is disposed such that the two arm parts 114a are held in contact with the bearing 113 at two opposed points on an outer periphery of the bearing 113. The driven arm 114 is an example embodiment that correspond to the "connecting aim" according to the present invention.

As shown in FIG. 1, the spindle 115 is arranged to extend in a direction (vertical direction as viewed in FIG. 1) perpendicular to an extending direction of the output shaft 111 of the electric motor 110 (longitudinal direction of the oscillating tool 100). The spindle 115 is rotatably supported on the body housing 101 by two bearings 116. The blade 10 is removably attached to the other end region of the spindle 115 via a tool holding mechanism 103. The spindle 115 is an example embodiment that correspond to the "tool accessory drive shaft" according to the present invention. Further, in the extending direction of the spindle 115, the driven arm 114 side (upper side as viewed in FIG. 1) and the blade 10 side (lower side as viewed in FIG. 1) are defined as an upper side and a lower side of the oscillating tool 100, respectively.

A front weight 160 is mounted between the front bearing 111a and the eccentric shaft 112 on a front end part of the output shaft 111 of the motor 110. In other words, the front weight 160 is disposed in front of the front bearing 111a of the output shaft 111. The front weight 160 serves as a balancer which is driven while facing the eccentric shaft 112 when the motor 110 is driven. The front weight 160 is an example embodiment that correspond to the "second balancer" according to the present invention. Specifically, the front weight 160 is provided as a member for eliminating imbalance of rotation of the output shaft 111 by reducing moment acting on the output shaft 111 in front of the front bearing 111a of the output shaft 111. Thus, the front weight 160 is arranged to be driven with the center of gravity of the front weight 160 in opposite phase to the eccentric shaft 112. Specifically, the center of gravity of the front weight 160 and the center of gravity of the eccentric shaft 112 are arranged symmetrically with respect to the axial center (center of rotation) of the output shaft 111. In other words, the center of gravity of the front weight 160 and the center of gravity of the eccentric shaft 112 are arranged on opposite sides of the axial center of the output shaft 111 to each other. The front weight 160 is mounted to the output shaft 111 so as to rotate together with the output shaft 111.

Figure 3:
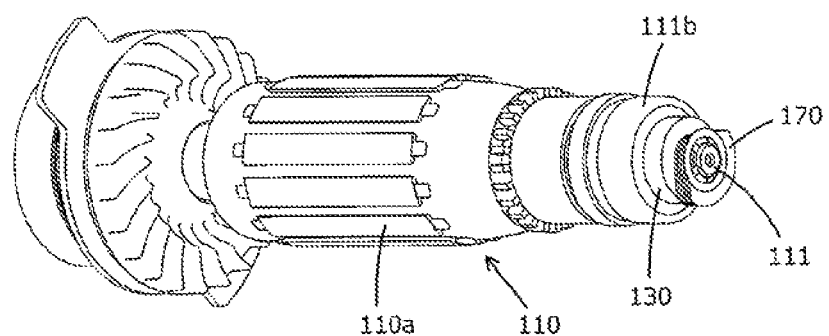
FIG. 3 is a perspective view showing an electric motor and a rear weight.

As shown in FIGS. 1 and 3, a magnet 130 and a rear weight 170 are mounted onto a rear end part of the output shaft 111 of the motor 110. The magnet 130 is cylindrical and is provided to detect the rotation speed of the motor 110. The rear weight 170 serves as a balancer which drives in the same direction as the eccentric shaft 112 when the motor 110 is driven. The rear weight 170 is an example embodiment that correspond to the "balancer" according to the present invention. The bearings 111a, 111b or supporting points of the output shaft 111 are arranged between the rear weight 170 and the eccentric shaft 112 in the axial direction of the output shaft 111. With this structure, the rear weight 170 reduces moment which acts on the bearings 111a, 111b serving as the supporting points of the output shaft 111. The rear end part of the output shaft 111 is formed in a cantilever form protruding rearward from the rear bearing 111b. The magnet 130 is mounted onto the cantilever output shaft 111 at a position adjacent to the rear bearing 111b. Further, the rear weight 170 is mounted onto the output shaft 111 at a position closer to the rear end of the output shaft 111 than the magnet 130. Thus, the magnet 130 and the rear weight 170 rotate together with the output shaft 111.

As shown in FIG. 1, a magnetic sensor 131 is mounted to face the magnet 130 in the body housing 101. The magnetic sensor 131 detects change of the magnetic field of the magnet 30 which rotates together with the output shaft 111, and thereby a controller (not shown) detects the rotation speed of the motor 110. Further, a speed change dial 190 is provided in a rear region of the body housing 101. When the user manually operates the speed change dial 190, the controller changes the rotation speed of the motor 110. A plural kinds of tool accessories such as a polishing tool and a cutting tool other than the blade 10 can be attached to the oscillating tool 100. Therefore, by changing the rotation speed of the motor 110, an appropriate rotation speed (oscillation frequency of the tool accessory) is set for an operation to be performed by each tool accessory.

Figure 4:
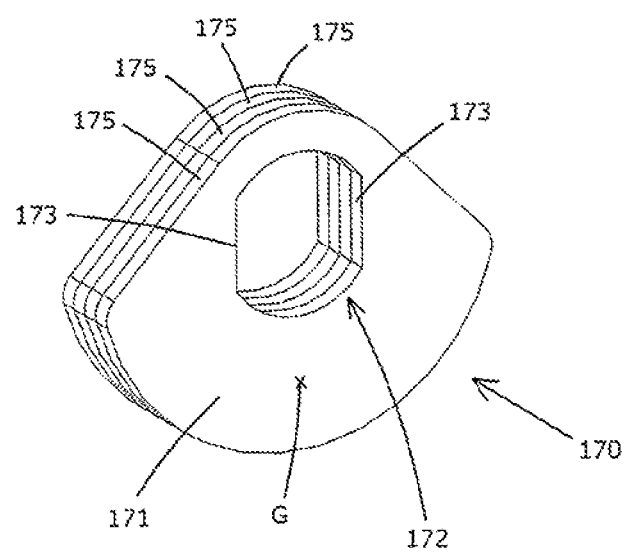
FIG. 4 is a perspective view of the rear weight.

As shown in FIG. 4, the rear weight 170 has a layered structure of a plurality of metal weight members 175. The weight members 175 (the rear weight 170) are generally fan-shaped or bell-shaped having a circular arc with a center angle of about 90 degrees. The rear weight 170 has a flat weight part 171 and a through hole 172 formed through the weight part 171. The through hole 172 has a pair of opposed flat parts 173. The output shaft 111 is inserted through the through hole 172 so that the rear weight 170 is mounted onto the output shaft 111. The flat parts 173 of the rear weight 170 mounted onto the output shaft 111 are engaged with a width across flat part of the output shaft 111, so that the rear weight 170 is prevented from rotating with respect to the output shaft 111. Thus, the rear weight 170 rotates together with the output shaft 111. The center of gravity G of the rear weight 170 is set substantially in a central region of the weight part 171 and arranged at a position displaced from the axial center (center of rotation) of the output shaft 111. Further, the front weight 160 has substantially the same shape as the rear weight 170. Therefore, the center of gravity of the front weight 160 is also arranged at a position displaced from the axial center (center of rotation) of the output shaft 111. A plurality of the weight members 175 form the rear weight 170 and the front weight 160, so that the number of the weight members 175 is set according to the required weight of the weights. Further, the structure of the front and rear weights 160, 170 is not limited to the layered structure of the weight members 175 (four weight members 175 in this embodiment), but the front weight 160 and/or the rear weight 170 may be formed by a single weight member having a prescribed thickness.

The front weight 160 and the rear weight 170 are arranged on opposite sides to each other with respect to the axial center (center of rotation) of the output shaft 111 of the motor 110. Specifically, the front weight 160 and the rear weight 170 are arranged on opposite sides of the output shaft 111 to each other in the radial direction of the output shaft 111. For example, as shown in FIG. 1, when the weight part of the front weight 160 is located on the upper side of the output shaft 111, the weight part 171 of the rear weight 170 is located on the lower side of the output shaft 111. Thus, the front weight 160 and the rear weight 170 which rotate together with the output shaft 111 are driven in opposite phase to each other. At this time, the front weight 160 is driven in opposite phase to the eccentric shaft 112, while the rear weight 170 is driven in the same phase as the eccentric shaft 112.

As shown in FIG. 1, the tool holding mechanism 103 is provided to hold the blade 10 and to transmit the output of the motor 110 to the blade 10 so as to oscillate (swing) the blade 10. The tool holding mechanism 103 is disposed on the lower end of the spindle 115 and mainly includes a flange 125 and a clamp shaft 126. The flange 125 is fixedly mounted on the lower end of the spindle 115. The clamp shaft 126 consists of a shaft part 127 and a clamp head 128 and is removably mounted to the spindle 115. The shaft part 127 is inserted and held in the spindle 115, so that the clamp shaft 126 is fixed to the spindle 115. In this manner, the blade 10 is clamped between the clamp head 128 and the flange 125. As connection between the clamp shaft 126 and the spindle 115, for example, screw connection or bayonet connection can be used.

When the switch 150 is turned on, current is supplied from the power cable 20 to the motor 110 and the motor 110 is driven. As shown in FIG. 2, when the output shaft 111 rotates by driving of the motor 110, the eccentric shaft 112 is rotationally driven around the axial center of the output shaft 111. Thus, the eccentric shaft 112 is reciprocally driven in a transverse direction of the oscillating tool 100 (vertical direction as viewed in FIG. 2) perpendicular to the extending direction of the spindle 115 (vertical direction of the oscillating tool 100) and to the extending direction of the output shaft 111 of the motor 110 (longitudinal direction of the oscillating tool 100). Thus, the eccentric shaft 112 and the bearing 113 mounted on the eccentric shaft 112 are reciprocally driven in a direction of arrow A (hereinafter referred to as a direction A).

The bearing 113 is held in contact with the driven arm 114, so that reciprocating motion of the eccentric shaft 112 and the bearing 113 in the direction A is transmitted to the driven arm 114. As a result, the driven arm 114 is reciprocally driven along a circular arc having a prescribed center angle in a direction around the axis of the spindle 115 which is shown by arrow B (hereinafter referred to as a direction B). Specifically, the spindle 115 is reciprocally driven by a prescribed angle around the axis of the spindle 115. Thus, the blade 10 mounted onto the spindle 115 is reciprocally driven around the spindle 115 in the direction B.

The driven arm 114 extends rearward (toward the motor 110) from the spindle 115 in the oscillating tool 100, and the blade 10 extends forward of the oscillating tool 100 from the spindle 115. Specifically, the driven arm 114 and the blade 10 extend from the spindle 115 in opposite directions. Thus, the arm parts 114a of the driven arm 114 and a tip of the blade 110 are driven in opposite directions in the direction B. As a result, the tip of the blade 110 is reciprocally driven along a circular arc having a prescribed center angle (cf. 10 degrees), so that the blade 10 performs a cutting operation on a workpiece.

In the above-described oscillating tool 100, the driven arm 114 is reciprocally driven in the transverse direction of the oscillating tool 100 by the reciprocating motion of the eccentric shaft 112 in the transverse direction of the oscillating tool 100 (vertical direction as viewed in FIG. 2). At this time, the front weight 160 is driven in opposite phase to the eccentric shaft 112. Thus, the front weight 160 is moved in an opposite direction to the driven arm 114 and the eccentric shaft 112 in the transverse direction of the oscillating tool 100. Specifically, when the driven arm 114 and the eccentric shaft 112 move to the right in the oscillating tool 100, the center of gravity of the front weight 160 moves to the left in the oscillating tool 100. On the other hand, when the driven arm 114 and the eccentric shaft 112 move to the left in the oscillating tool 100, the center of gravity of the front weight 160 moves to the right in the oscillating tool 100. Therefore, the centrifugal force of the front weight 160 acts in an opposite direction to the centrifugal force of the eccentric shaft 112 which is driven around the axial center of the output shaft 111. Thus, the centrifugal force of the eccentric shaft 112 is cancelled by the centrifugal force of the front weight 160. Specifically, the front weight 160 suppresses precession of the output shaft 111 around the front bearing 111a which is caused by the influence of the centrifugal force of the eccentric shaft 112. In other words, the front weight 160 serves as a balancer for reducing a radial force acting on the output shaft 111.

The rear weight 170 is driven in opposite phase to the front weight 160. Specifically, the rear weight 170 is driven in the same phase as the driven arm 114 and the eccentric shaft 112. Thus, the centrifugal force of the eccentric shaft 112 (reaction force from the driven arm 114) acting on the front end of the output shaft 111 which is located forward of the front bearing 111a serving as a supporting point of the output shaft 111 acts in the same direction in the transverse direction as the centrifugal force generated by rotation of the rear weight 170 and acting on the rear end of the output shaft 111 which is located rearward of the rear bearing 111b serving as a supporting point of the output shaft 111. Therefore, the moment (particularly the moment in the direction B) around the axis in the radial direction (particularly the vertical direction) of the output shaft 111 which acts on the bearings 111a, 111b is reduced. As a result, the output shaft 111 is stably rotated around the axis, so that vibration caused in the body housing 101 is suppressed. Further, the bearings 111a, 111b are prevented from being acted upon by uneven force, so that durability of the bearings 111a, 111b is enhanced.

It is preferable that the eccentric shaft 112 is heavy in order to drive the relatively heavy blade 10, spindle 115 and driven arm 114. When the eccentric shaft 112 is heavy, relatively large moment acts on the output shaft 111 (the bearings 111a, 111b) by the centrifugal force of the eccentric shaft 112. Therefore, it is preferable to increase the weight of the rear weight 170 in order to reduce the moment which acts on the output shaft 111 (the bearings 111a, 111b) by the centrifugal force of the eccentric shaft 112.

In the first embodiment, the rear weight 170 consisting of a plurality of the weight members 175 can obtain a required weight by appropriately setting the number of the weight members 175. Further, like the rear weight 170, the front weight 160 can also obtain a required weight to cancel the centrifugal force of the eccentric shaft 112 by appropriately setting the number of the weight members 175.

Further, in order to reduce the moment which acts on the output shaft 111 (the bearings 111*a*, 111*b*) by the centrifugal force of the eccentric shaft 112, the rear weight 170 may be arranged as rearward as possible such that the moment caused by the rear weight 170 is increased. In this case, the moment around the vertically extending axis which acts on the output shaft 111 acts around a virtual point at a midpoint between the bearings 111*a* and 111*b*. This virtual point is defined as a substantially central point of the motor 110 in the axial direction of the output shaft 111. The distance between the substantially central point of the motor 110 and the rear weight 170 is set to be longer than the distance between the substantially central point of the motor 110 and the eccentric shaft 112.

(Second Embodiment)

A second embodiment of the present invention is now described with reference to FIGS. 5 to 7. An electric oscillating tool 200 of the second embodiment is different from the electric oscillating tool 100 of the first embodiment in the structure of the rear weight 170 and the magnet 130. The other components are substantially identical to those in the first embodiment, and therefore they are given like numerals and are not described.

Figure 5:
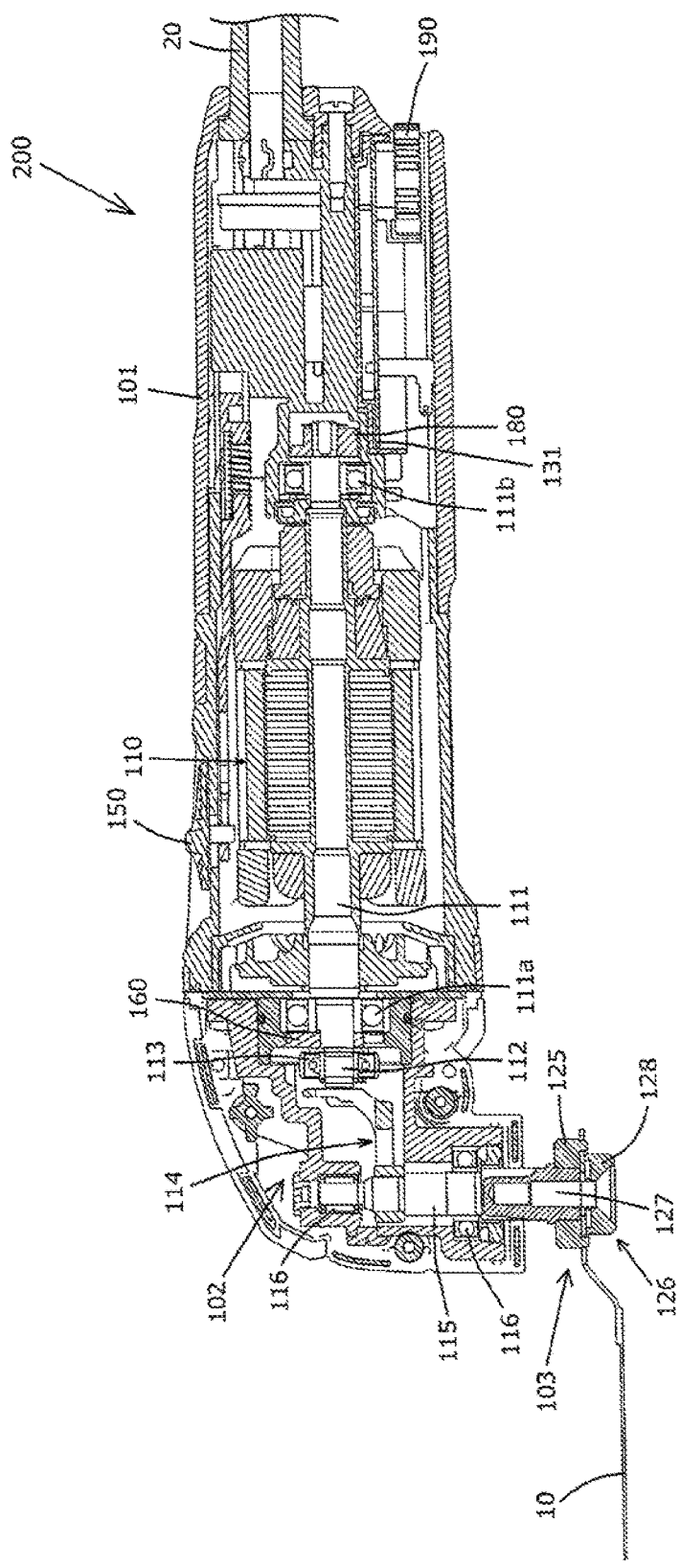
FIG. 5 is a sectional view showing the overall structure of a work tool according to a second embodiment of the present invention.
Figure 6:
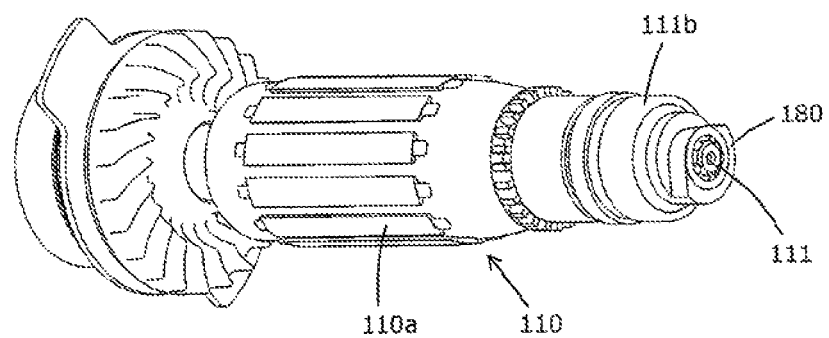
FIG. 6 is a perspective view showing an electric motor and a rear weight.
Figure 7:
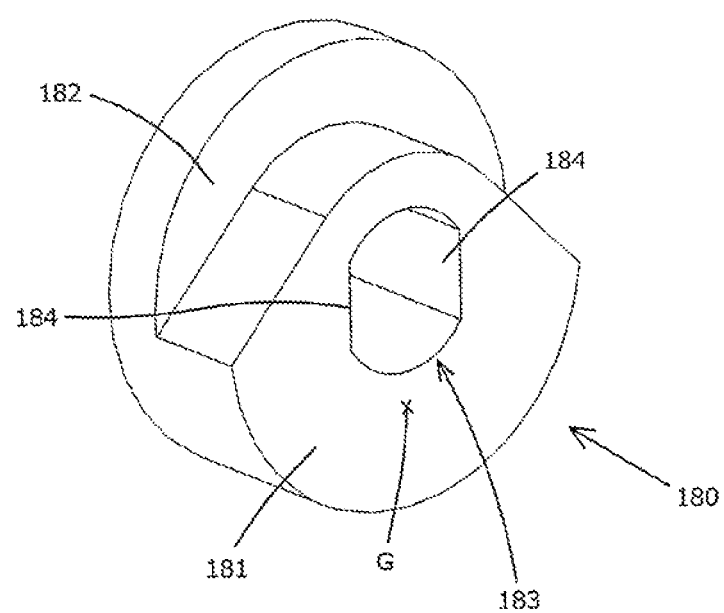
FIG. 7 is a perspective view of the rear weight.

As shown in FIGS. 5 to 7, a rear weight 180 of the second embodiment is formed of a magnetic material. The rear weight 180 has a generally fan-shaped weight part 181 having a circular arc with a center angle of about 90 degrees, a disc-like base 182, and a through hole 183 formed through the weight part 181 and the base 182. Specifically, the weight part 181 is formed to protrude from the base 182 in the axial direction of the base 182. The through hole 183 has a pair of opposed flat parts 184. The rear weight 180 is mounted onto the output shaft 111 by inserting the output shaft 111 through the through hole 183. The flat parts 184 of the rear weight 180 mounted onto the output shaft 111 are engaged with a width across flat part of the output shaft 111, so that the rear weight 180 is prevented from rotating with respect to the output shaft 111. Thus, the rear weight 180 rotates together with the output shaft 111. The center of gravity G of the rear weight 180 is set substantially in a central region of the weight part 181 and arranged at a position displaced from the axial center (center of rotation) of the output shaft 111.

In the second embodiment, the same effect as the first embodiment can be obtained. Further, in the second embodiment, having the rear weight 180 formed of a magnetic material, it is not necessary to provide a magnet for detecting the rotation speed of the motor 110. Therefore, the parts count of the electric oscillating tool 200 can be reduced. Specifically, a magnetic sensor 131 detects change of the magnetic field of the rear weight 180 formed of a magnetic material, so that the rotation speed of the motor 110 is detected.

In the above-described first and second embodiments, the electric oscillating tool (multi-tool) is described as a representative example of the work tool, but the present invention is not limited to this. The present invention can also be applied to other work tools, such as an impact tool like an electric hammer and an electric hammer drill, in which an eccentric shaft is rotationally driven by an output shaft of an electric motor and thereby the output shaft is acted upon by moment.

Further, in the first and second embodiments, the eccentric shaft 112 is directly mounted onto the output shaft 111, but it may be mounted otherwise. For example, a crank shaft having a larger diameter than the output shaft 111 may be mounted onto the output shaft 111, and the eccentric shaft 112 may be mounted onto the crank shaft. In this case, the eccentric shaft 112 can be arranged outside the output shaft 111 in the radial direction of the output shaft 111.

In the first and second embodiments, the rear weight 170, 180 is directly mounted onto the output shaft 111, but it may be mounted in the other manner. For example, the rear weight 170, 180 may be connected to the output shaft 111 via a connecting member. In this case, the connecting member is driven by rotation of the output shaft 111 and thereby drives the rear weight 170, 180.

In the first and second embodiments, the rear weight 170, 180 is formed as one piece in the circumferential direction of the output shaft 111, but it may be formed otherwise. For example, the rear weight 170, 180 may be formed by a plurality of rolling members which can move around the output shaft 111. The rolling members suitable include rollers and balls.

In the first and second embodiments, the front weight 160 is provided, but only the rear weight 170, 180 may be provided and the front weight 160 may be dispensed with.

In view of the object of the above-described invention, work tools according the present invention can have the following features. Each feature may be used alone or in combination with others, or in combination with the claimed invention.

(Aspect 1)

The balancer has a weight part having a prescribed weight, and the center of gravity of the weight part is arranged at a position displaced from the axial center of the output shaft.

(Aspect 2)

The weight part has a layered structure of a plurality of weight elements.

(Aspect 3)

The work tool has a magnetic sensor for detecting rotation speed of the motor, a magnet is mounted onto the output shaft of the motor and rotates together with the output shaft, and the magnetic sensor detects the rotation speed of the motor based on change of a magnetic field by rotation of the magnet.

(Aspect 4)

The center of gravity of the magnet mounted onto the output shaft of the motor is arranged at a position displaced from the axial center of the output shaft, and the magnet serves as a balancer.

(Aspect 5)

The motor has a motor body having a rotor and a stator, the balancer is disposed closer to the other end of the output shaft than the motor body, and the distance between a substantially central point of the motor body and a center of gravity of the balancer is longer than the distance between the substantially central point of the motor body and the center of gravity of the eccentric shaft in the extending direction of the output shaft.

(Aspect 6)

The substantially central point of the motor body is defined as a point on the output shaft which is equidistant from the first bearing part on one end region of the output shaft and the second bearing part on the other end region of the output shaft.

(Correspondences Between the Features of the Embodiment and the Features of the Invention)

Correspondences between the features of the embodiment and the features of the invention are as follows. The above-described embodiment is a representative example for embodying the present invention, and the present invention is not limited to the structures that have been described as the representative embodiment.

The electric motor 110 is an example embodiment that corresponds to the "motor" according to the present invention.

The output shaft 111 is an example embodiment that corresponds to the "output shaft" according to the present invention.

The front bearing 111a is an example embodiment that correspond to the "bearing member" according to the present invention.

The front bearing 111a is an example embodiment that correspond to the "first bearing part" according to the present invention.

The rear bearing 111b is an example embodiment that correspond to the "bearing member" according to the present invention. The rear bearing 111b is an example embodiment that correspond to the "second bearing part" according to the present invention.

The eccentric shaft 112 is an example embodiment that correspond to the "eccentric shaft" according to the present invention.

The driven arm 114 is an example embodiment that correspond to the "connecting arm" according to the present invention.

The spindle 115 is an example embodiment that correspond to the "tool accessory drive shaft" according to the present invention.

The front weight 160 is an example embodiment that correspond to the "second balancer" according to the present invention. The rear weight 170 is an example embodiment that correspond to the "balancer" according to the present invention.

The weight part 171 is an example embodiment that correspond to the "fan-shaped part" according to the present invention.

The rear weight 180 is an example embodiment that correspond to the "balancer" according to the present invention.

The weight part 181 is an example embodiment that correspond to the "fan-shaped part" according to the present invention.

DESCRIPTION OF THE NUMERALS 10 blade
20 power cable
100 electric oscillating tool
101 body housing
102 driving mechanism
103 tool holding mechanism
110 electric motor
111 output shaft
111a front bearing
111b rear bearing
112 eccentric shaft
113 bearing
114 driven arm
114a arm part
115 spindle
125 flange
126 clamp shaft
127 shaft part
128 clamp head
130 magnet
150 switch
160 weight
170 weight
171 weight part
172 through hole
173 flat part
175 weight member
180 weight
181 weight part
182 base
183 through hole
184 flat part
190 speed change dial

The invention claimed is:

1. A work tool, which performs an operation on a workpiece by driving a tool accessory, comprising:
a motor having a motor body and an output shaft, the motor body including a stator and a rotor, the output shaft being rotatable with the rotor and having a first end and a second end, the motor body being disposed between the first end and the second end;
a bearing member that rotatably supports the output shaft on a first-end side of the motor body in an axial direction of the motor shaft;
an eccentric shaft that is connected to the output shaft on an opposite side of the bearing member from the motor body in the axial direction and displaced from a center of a rotation axis of the output shaft, and is rotationally driven together with the output shaft by rotation of the output shaft to thereby drive the tool accessory; and
a balancer that is connected to the output shaft on a second-end side of the motor body in the axial direction and is rotationally driven around the rotation axis of the output shaft by rotation of the output shaft.

2. The work tool as defined in claim 1, further comprising:
a tool accessory drive shaft to which the tool accessory is attached, and
a connecting arm connected to the tool accessory drive shaft, wherein:
the connecting arm is configured to swing around the tool accessory drive shaft in a crossing direction crossing the axial direction, by reciprocating movement of the eccentric shaft in the crossing direction which is caused by rotation of the output shaft,
the tool accessory is configured to swing around the tool accessory drive shaft by swinging of the connecting arm, and
the balancer is configured to be driven with a center of gravity of the balancer in the same phase as the eccentric shaft in the crossing direction.

3. The work tool as defined in claim 2, further comprising:
a second balancer that is arranged closer to one end of the output shaft than the bearing member in the axial direction, wherein:
the second balancer is configured to be driven with a center of gravity of the second balancer in opposite phase to the eccentric shaft in the crossing direction.

4. The work tool as defined in claim 1, wherein:
the bearing member includes a first bearing part for supporting one end region of the output shaft and a second bearing part for supporting the other end region of the output shaft in the axial direction, and
the balancer is disposed on a side of the second bearing part opposite to the eccentric shaft in the axial direction.

5. The work tool as defined in claim 4, wherein:
the first bearing part is arranged closer to one end of the output shaft than the motor body in the axial direction, and the second bearing part is arranged closer to the other end of the output shaft than the motor body in the axial direction.

6. The work tool as defined in claim 1, wherein the balancer is mounted onto the output shaft.

7. The work tool as defined in claim 6, wherein the balancer has a fan-shaped part having a circular arc part around the center of the rotation axis of the output shaft in a section perpendicular to the axial direction.

8. A work tool, which performs an operation on a workpiece by driving a tool accessory, comprising:
a motor having an output shaft;
a bearing member that rotatably supports the output shaft;
an eccentric shaft that is connected to the output shaft at a position located closer to one end of the output shaft than the bearing member in an output shaft extending direction in which the output shaft extends and displaced from a center of a rotation axis of the output shaft, and is rotationally driven together with the output shaft by rotation of the output shaft to thereby drive the tool accessory;
a balancer that is connected to the output shaft at a position located closer to the other end of the output shaft than the bearing member in the output shaft extending direction and is rotationally driven around the rotation axis of the output shaft by rotation of the output shaft;
a tool accessory drive shaft to which the tool accessory is attached; and
a connecting arm connected to the tool accessory drive shaft, wherein:
the connecting arm is configured to swing around the tool accessory drive shaft in a crossing direction crossing the output shaft extending direction, by reciprocating movement of the eccentric shaft in the crossing direction which is caused by rotation of the output shaft,
the tool accessory is configured to swing around the tool accessory drive shaft by swinging of the connecting arm, and
the balancer is configured to be driven with a center of gravity of the balancer in the same phase as the eccentric shaft in the crossing direction.

9. The work tool as defined in claim 8, further comprising:
a second balancer that is arranged closer to the one end of the output shaft than the bearing member in the output shaft extending direction, wherein:
the second balancer is configured to be driven with a center of gravity of the second balancer in opposite phase to the eccentric shaft in the crossing direction.

10. The work tool as defined in claim 8, wherein:
the bearing member includes a first bearing part for supporting one end region of the output shaft and a second bearing part for supporting the other end region of the output shaft in the output shaft extending direction, and
the balancer is disposed on a side of the second bearing part opposite to the eccentric shaft in the output shaft extending direction.

11. The work tool as defined in claim 10, wherein:
the motor has a motor body having a rotor and a stator,
the first bearing part is arranged closer to the one end of the output shaft than the motor body in the output shaft extending direction, and
the second bearing part is arranged closer to the other end of the output shaft than the motor body in the output shaft extending direction.

12. The work tool as defined in claim 8, wherein the balancer is mounted onto the output shaft.

13. The work tool as defined in claim 12, wherein the balancer has a fan-shaped part having a circular arc part around the center of the rotation axis of the output shaft in a section perpendicular to the output shaft extending direction.

* * * * *